US012282265B2

(12) United States Patent
Nishimura et al.

(10) Patent No.: US 12,282,265 B2
(45) Date of Patent: Apr. 22, 2025

(54) IMAGE FORMING APPARATUS

(71) Applicant: KYOCERA Document Solutions Inc., Osaka (JP)

(72) Inventors: Keiya Nishimura, Osaka (JP); Yohei Wakasa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/628,022

(22) Filed: Apr. 5, 2024

(65) Prior Publication Data

US 2024/0345500 A1 Oct. 17, 2024

(30) Foreign Application Priority Data

Apr. 13, 2023 (JP) ................................ 2023-065611

(51) Int. Cl.
*G03G 15/02* (2006.01)
*G03G 21/00* (2006.01)

(52) U.S. Cl.
CPC ..... *G03G 15/0266* (2013.01); *G03G 21/0058* (2013.01)

(58) Field of Classification Search
CPC .......... G03G 15/0266; G03G 21/0058; G03G 21/0005; G03G 2221/0005
See application file for complete search history.

(56) References Cited

U.S. PATENT DOCUMENTS

2003/0175042 A1* 9/2003 Nishimura ......... G03G 21/0005 399/98
2014/0356006 A1* 12/2014 Adachi .............. G03G 15/0266 399/50
2015/0117882 A1 4/2015 Wakamatsu et al. ........................ G03G 15/065
2017/0031315 A1* 2/2017 Suzuki ................. G03G 21/203

FOREIGN PATENT DOCUMENTS

JP 2015-087416 A 5/2015

* cited by examiner

*Primary Examiner* — Sandra Brase
(74) *Attorney, Agent, or Firm* — Stein IP, LLC

(57) ABSTRACT

In the image forming apparatus, a controller applies a collection voltage to a cleaning roller by a voltage application part in image formation process. The controller adjusts the collection voltage applied to the cleaning roller on bases of uncollected toner quantity of a toner image and residual charge of an image carrier, the uncollected toner being part of after-transfer remaining toner which results after formation of the toner image on an outer circumferential surface of the image carrier and transfer of the toner image onto a transfer-objective member, and which has missed being collected by the cleaning roller so as to remain even after one-round rotation of the image carrier.

5 Claims, 8 Drawing Sheets

IMAGE FORMING APPARATUS

INCORPORATION BY REFERENCE

This application is based on and claims the benefit of priority from Japanese Patent Application No. 2023-065611 filed on Apr. 13, 2023, the contents of which are hereby incorporated by reference.

BACKGROUND

The present disclosure relates to an image forming apparatus.

In an image forming apparatus of electrophotographic system such as copiers and printers, there has been widely used a device for forming a toner image, which is to be transferred onto a paper sheet in later process, by feeding toner and executing development for an electrostatic latent image formed on an outer circumferential surface of a photosensitive drum serving as an image carrier. With such an image forming apparatus, there is a need for collecting after-transfer remaining toner, which has missed being fully transferred from the photosensitive drum onto an intermediate transfer belt or paper sheet or other transfer-objective member so as to remain on the photosensitive drum, in order that such after-transfer remaining toner does not affect subsequent image formation.

SUMMARY

An image forming apparatus according to one aspect of the present disclosure includes an image carrier, a charging part, an exposure part, a developing part, a transfer part, a cleaning roller, a voltage application part, and a controller. In the image carrier, a photosensitive layer is formed on its outer circumferential surface. The charging part electrically charges the outer circumferential surface of the image carrier to a specified surface potential. The exposure part makes the outer circumferential surface of the image carrier, which has been electrically charged by the charging part, exposed to light to form an electrostatic latent image with its charging level attenuated. The developing part feeds toner to the electrostatic latent image on the image carrier to form a toner image. The transfer part transfers the toner image, which has been formed on the outer circumferential surface of the image carrier, onto a transfer-objective member. The cleaning roller removes and collects deposits on the outer circumferential surface of the image carrier. The voltage application part controls electric energization of the charging part, the developing part, the transfer part, and the cleaning roller. The controller controls the image carrier, the charging part, the developing part, the transfer part, the cleaning roller, and the voltage application part. The voltage application part is enabled to apply a bipolar voltage to the cleaning roller. In image formation process, the controller makes a collection voltage applied to the cleaning roller by the voltage application part. Then, the controller adjusts the collection voltage applied to the cleaning roller on a basis of uncollected toner quantity of the toner image, as well as on a basis of residual charge on the image carrier, where the uncollected toner refers to part of after-transfer remaining toner which results after the toner image formed on the outer circumferential surface of the image carrier has been transferred onto the transfer-objective member, and moreover which has missed being collected by the cleaning roller so as to remain even after one-round rotation of the image carrier.

DETAILED DESCRIPTION

Hereinafter, an embodiment of the present disclosure will be described with reference to the accompanying drawings. It is to be noted that the present disclosure is not limited to the following contents.

Figure 1:
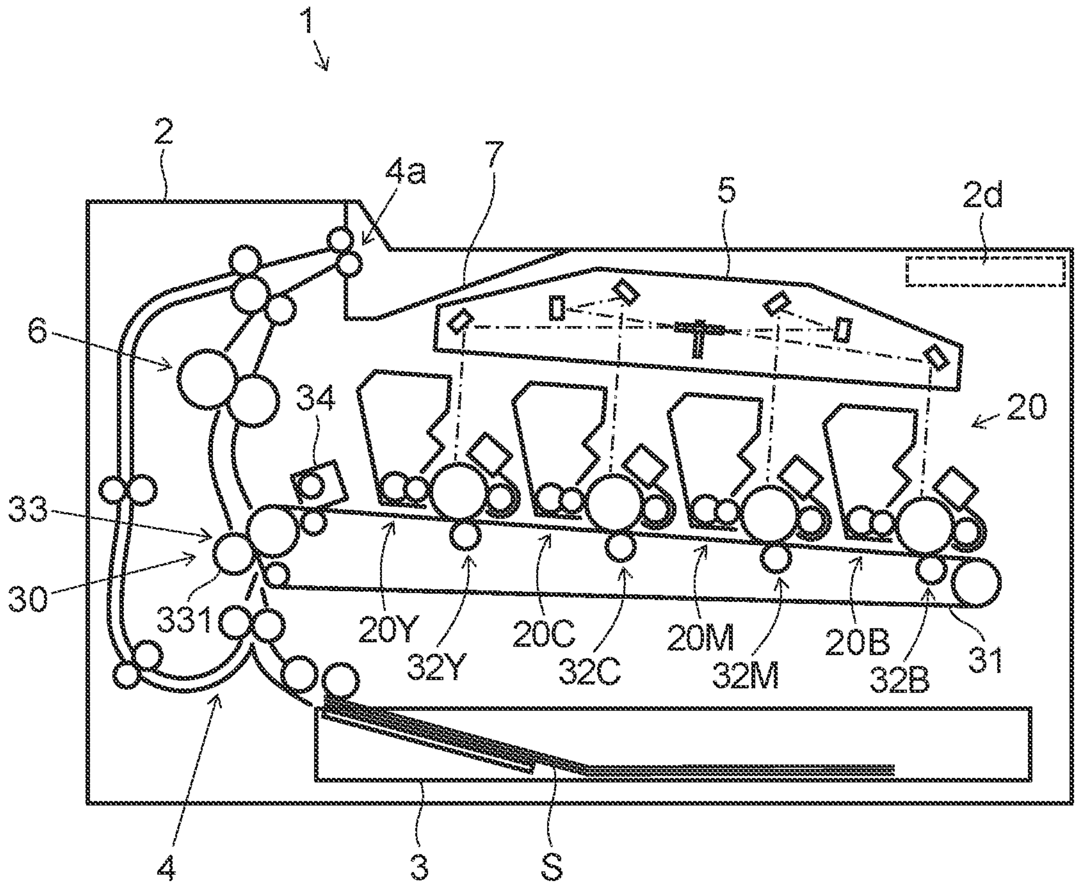
FIG. 1 is a schematic cross-sectional front view of an image forming apparatus according to one embodiment of the present disclosure.
Figure 2:
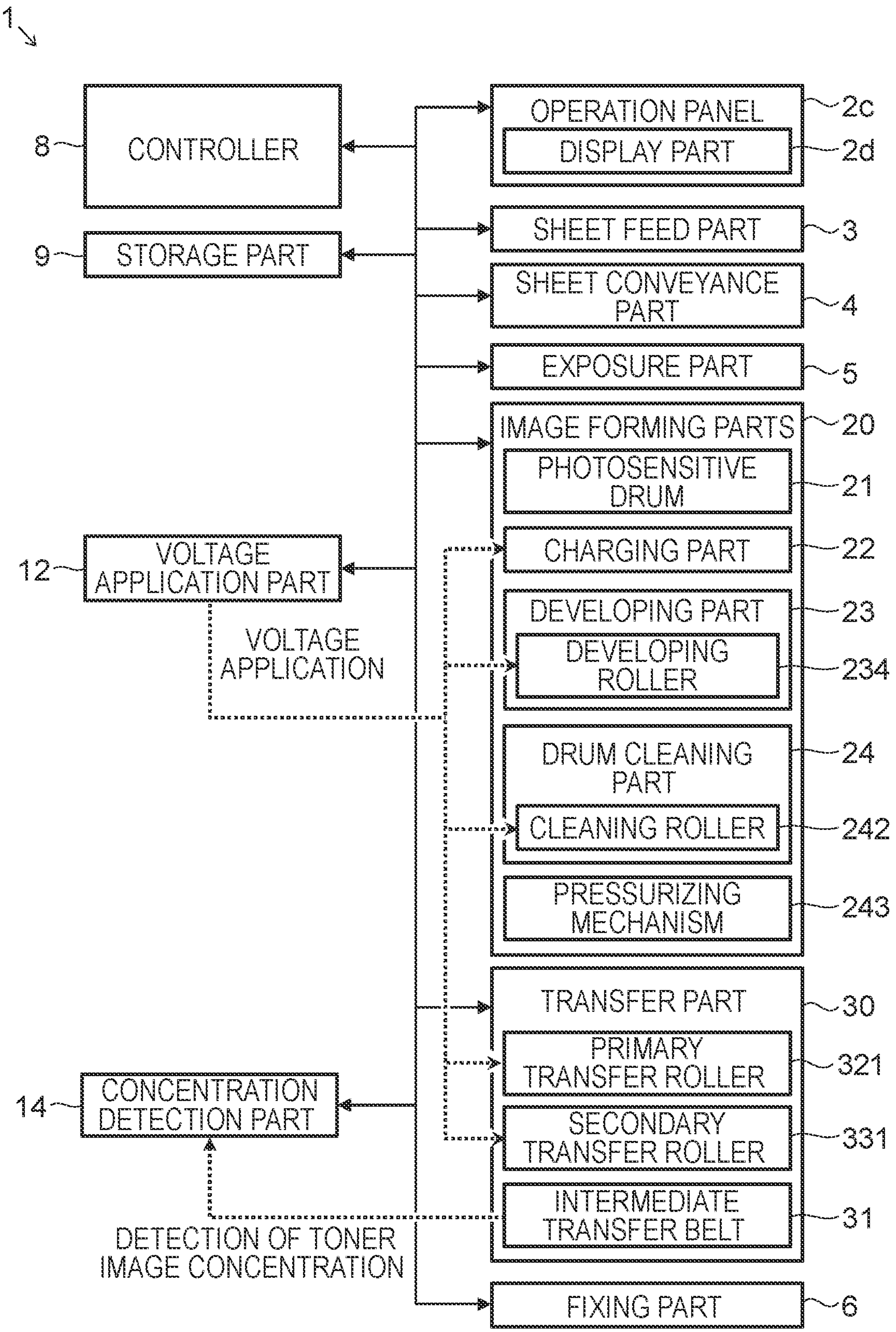
FIG. 2 is a block diagram showing a configuration of the image forming apparatus of FIG. 1.
Figure 3:
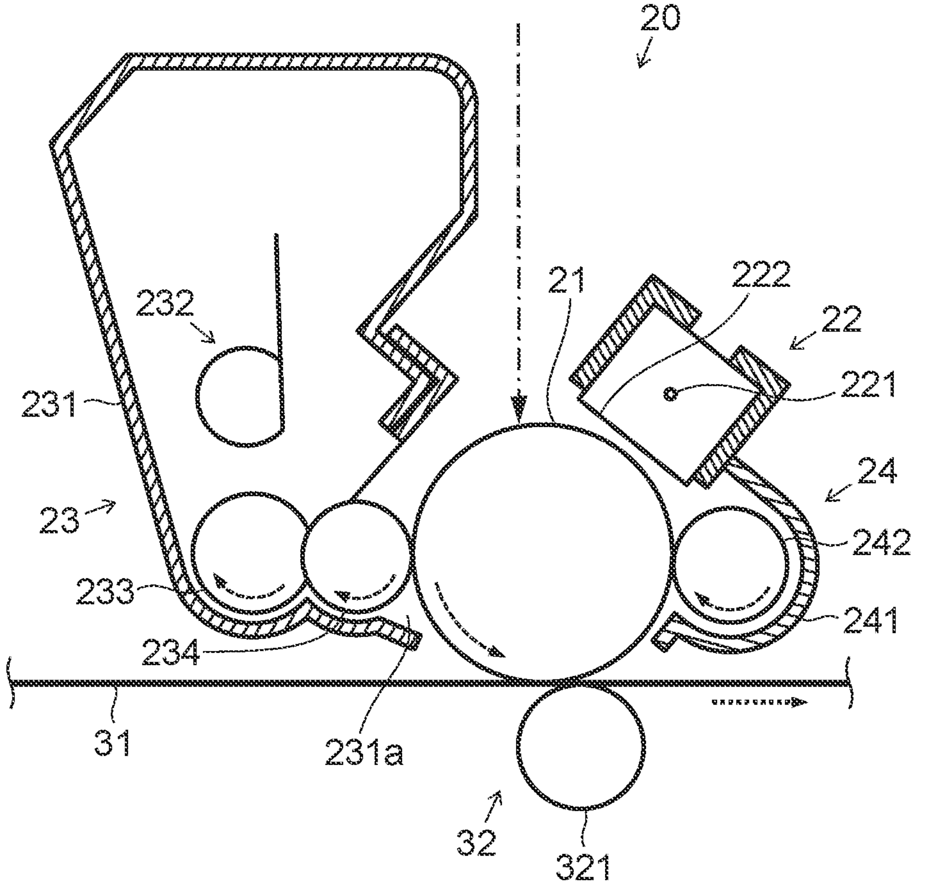
FIG. 3 is a schematic cross-sectional front view of around an image forming part in the image forming apparatus of FIG. 1.

FIG. 1 is a schematic cross-sectional front view of an image forming apparatus 1 according to this embodiment. FIG. 2 is a block diagram showing a configuration of the image forming apparatus 1 of FIG. 1. FIG. 3 is a schematic cross-sectional front view of around an image forming part 20 in the image forming apparatus 1 of FIG. 1. One example of the image forming apparatus 1 according to this embodiment is a tandem-type color printer in which upon accepting image data and print instructions associated with a print job from an external computer, a toner image is transferred onto a paper sheet S with use of an intermediate transfer belt 31. The image forming apparatus 1 may also be a so-called multifunction peripheral equipped with such functions as printing, scanning (image reading), and facsimile transmission.

As shown in FIGS. 1, 2 and 3, the image forming apparatus 1 includes a sheet feed part 3, a sheet conveyance part 4, an exposure part 5, image forming parts 20, a transfer part 30, a fixing part 6, a sheet discharge part 7, a controller 8, and a storage part 9, as these are provided in an apparatus housing 2.

The housing 2 is equipped with an operation panel 2*c*. The operation panel 2*c* is placed at an frontal upper portion of the housing 2, as an example, with a display part 2*d* such as a liquid crystal display included therein. The operation panel 2*c* displays, on the display part 2*d*, settings as to print conditions such as type and size of a sheet S to be used for printing, scale-up and scale-down, one-sided printing or double-sided printing or one-page intensive printing, as well as screen images associated with entry of an execution instruction or the like, and moreover the operation panel 2*c* accepts those entries directly from an apparatus user. Further, the display part 2*d* also serves as an informing part that displays, for example, statuses of the image forming apparatus 1, notices, error massages and the like so as to make those pieces of information knowable to the user.

The sheet feed part 3 is placed at a bottom portion of the housing 2. The sheet feed part 3, containing a plurality of unprinted paper sheets S, separates a sheet S therefrom and feeds out the sheet S one by one on occasions of printing. The sheet conveyance part 4 extends in an up/down direction along a side wall of the housing 2. The sheet conveyance part 4 conveys a sheet S, which has been fed out from the sheet feed part 3, to a secondary transfer part 33 and the fixing part 6, and further discharges the after-fixation sheet S through a sheet discharge port 4*a* to the sheet discharge part 7. The exposure part 5 is placed at an upper portion in the housing 2. The exposure part 5 applies laser light, which has been controlled based on image data, toward the image forming parts 20.

The image forming parts 20 are placed below the exposure part 5 and above the intermediate transfer belt 31. The image forming parts 20 include a yellow-destined image forming part 20Y, a cyan-destined image forming part 20C, a magenta-destined image forming part 20M, and a black-destined image forming part 20B. These four image forming parts 20 are identical in basic configuration. Therefore, hereinafter, unless otherwise necessarily particularly limited, the identification signs 'Y', 'C', 'M' and 'B' representing individual colors, respectively, may be omitted from time to time.

Each image forming part 20 includes a photosensitive drum (image carrier) 21 which is supported rotatable in a specified direction (counterclockwise in FIGS. 1 and 3). The image forming part 20 further includes a charging part 22, a developing part 23, and a drum cleaning part (cleaning part) 24, as these are disposed around the photosensitive drum 21 along its rotational direction. In addition, a primary transfer part 32 is placed between the developing part 23 and the drum cleaning part 24.

The photosensitive drum 21 has a photosensitive layer formed on its outer circumferential surface. The charging part 22 electrically charges the outer circumferential surface of the photosensitive drum 21 to a specified surface potential. The exposure part 5 illuminates the outer circumferential surface of the photosensitive drum 21 charged by the charging part 22 so that an electrostatic latent image of an original image with its charging level attenuated is formed on the outer circumferential surface of the photosensitive drum 21. The developing part 23, by feeding toner to the electrostatic latent image on the outer circumferential surface of the photosensitive drum 21, makes the electrostatic latent image developed to form a toner image. The four image forming parts 20 form toner images of different colors, respectively.

After a toner image is primarily transferred onto an outer circumferential surface of the intermediate transfer belt 31, the drum cleaning part 24 removes and collects toner (after-transfer remaining toner) and other deposits remaining on the outer circumferential surface of the photosensitive drum 21. After-transfer remaining toner that has missed being fully collected by the drum cleaning part 24 and remaining on the outer circumferential surface of the photosensitive drum 21 is collected by the developing part 23 after having passed through the charging part 22. In this way, the image forming parts 20 form an image (toner image) that is to be transferred onto the sheet S in later process.

The transfer part 30 includes an intermediate transfer belt (belt) 31, primary transfer parts 32Y, 32C, 32M, 32B, a secondary transfer part 33, and a belt cleaning part 34. The intermediate transfer belt 31 is placed below the four image forming parts 20 and above the sheet feed part 3. The intermediate transfer belt 31 is placed so as to face the four photosensitive drums 21. The intermediate transfer belt 31 is an endless intermediate transferer which is supported so as to be turnable in a specified direction (clockwise in FIG. 1) and to which toner images formed by the four image forming parts 20, respectively, are primarily transferred in superimposition one after another. The four image forming parts 20 are placed in such a so-called tandem mode as to be arrayed in one line from upstream side toward downstream side of a turning direction of the intermediate transfer belt 31.

The primary transfer parts 32Y, 32C, 32M, 32B are placed under the individual-color image forming parts 20Y, 20C, 20M, 20B, respectively, with the intermediate transfer belt 31 pinched therebetween. The secondary transfer part 33 is placed upstream of the fixing part 6 in a sheet conveyance direction of the sheet conveyance part 4, as well as downstream of the four image forming parts 20Y, 20C, 20M, 20B in the turning direction of the intermediate transfer belt 31. The belt cleaning part 34 is placed downstream of the secondary transfer part 33 in the turning direction of the intermediate transfer belt 31.

Each primary transfer part 32 transfers a toner image, which has been formed on the outer circumferential surface of the photosensitive drum 21, onto the outer circumferential surface of the intermediate transfer belt (transfer-objective member) 31. In other words, the toner image is primarily transferred onto the outer circumferential surface of the intermediate transfer belt 31 at the individual-color primary transfer parts 32Y, 32C, 32M, 32B. Then, by the toner images of the four image forming parts 20 being transferred to the intermediate transfer belt 31 successively in superimposition at specified timings along with the turning of the intermediate transfer belt 31, a color toner image in which four-color toner images of yellow, cyan, magenta and black have been superimposed together is formed on the outer circumferential surface of the intermediate transfer belt 31.

The color toner image on the outer circumferential surface of the intermediate transfer belt 31 is transferred onto the sheet S fed in synchronization by the sheet conveyance part 4 at a secondary transfer nip portion formed in the secondary transfer part 33. The belt cleaning part 34 removes toner and other deposits remaining on the outer circumferential surface of the intermediate transfer belt 31 after secondary transfer, fulfilling the cleaning function. In this way, the transfer part 30 transfers (records) the toner image, which has been formed on the outer circumferential surface of the photosensitive drum 21, onto the sheet S.

The fixing part 6 is placed upward of the secondary transfer part 33. The fixing part 6 heats and pressurizes the sheet S, onto which the toner image has been transferred, so as to fix the toner image on the sheet S.

The sheet discharge part 7 is placed upward of the transfer part 30. The sheet S, on which the toner image has been fixed and for which printing is over, is conveyed to the sheet discharge part 7. The sheet discharge part 7 allows an after-printing sheet (printed matter) to be taken out from upward.

The controller 8 includes a CPU, an image processing part, and other electronic circuits and electronic components (none shown). The CPU, based on control programs and data stored in the storage part 9, controls operations of the individual component elements provided in the image forming apparatus 1 to execute processing related to functions of the image forming apparatus 1. The sheet feed part 3, the sheet conveyance part 4, the exposure part 5, the image forming parts 20, the transfer part 30 and the fixing part 6 receive instructions individually from the controller 8 to fulfill printing on the sheet S in linkage with one another.

The storage part 9 is made up, for example, by a combination of nonvolatile storage device such as program ROM (Read Only Memory), data ROM, or the like (not shown) and volatile storage device such as RAM (Random Access Memory) (not shown).

Also, the image forming apparatus 1, as shown in FIGS. 1 and 2, further includes a voltage application part 12 and a concentration detection part 14.

The voltage application part 12 includes, for example, a power supply part and a control circuit (neither shown). The voltage application part 12 is electrically connected to a charging wire 221 and a grid electrode 222 of the charging part 22, a developing roller 234 of the developing part 23, a cleaning roller 242 of the drum cleaning part 24, and a primary transfer roller 321 and a secondary transfer roller 331 of the transfer part 30. The voltage application part 12 controls electrical energization for the charging part 22, the developing part 23, the cleaning roller 242, and the transfer part 30.

In more detail, the voltage application part 12 applies a charging current to the charging wire 221 and a charging voltage to the grid electrode 222, applies a developing voltage (developing bias) to the developing roller 234, applies a collection voltage (cleaning bias) to the cleaning roller 242, and applies transfer voltages (transfer currents) to the primary transfer roller 321 and the secondary transfer roller 331. Via the voltage application part 12, the controller 8 controls application timing, voltage value (current value), polarity, application time, and the like of the voltages (currents) for the charging wire 221, the grid electrode 222, the developing roller 234, the cleaning roller 242, and the primary transfer roller 321 and the secondary transfer roller 331, respectively.

The concentration detection part 14 is placed upstream of the secondary transfer part 33 in the turning direction of the intermediate transfer belt 31. The concentration detection part 14 faces the outer circumferential surface of the intermediate transfer belt 31. The concentration detection part 14 is equipped with a reflection-type optical sensor which includes a light-emitting part including, e.g., LEDs (Light Emitting Diodes) or other light-emitting elements and a light-receiving part including, e.g., photodiodes or other light-receiving elements. The light-emitting part emits, at a specified angle, detection light toward a toner image transferred onto the outer circumferential surface of the intermediate transfer belt 31. The light-receiving part illuminates the toner image and receives detection light reflected by the toner image.

The light-receiving part includes a regular-reflection-light receiving part for receiving regular-reflection light and a diffuse-reflection-light receiving part for receiving diffuse-reflection light, each out of detection light reflected by the toner image. In the absence of toner on the outer circumferential surface of the intermediate transfer belt 31, detection light emitted from the light-emitting part is not diffusely reflected but regularly reflected by toner, thus mostly becoming incident on the regular-reflection-light receiving part. Then, as toner quantity on the outer circumferential surface of the intermediate transfer belt 31 increases more and more, larger and larger quantity of light is diffusely reflected by the toner, so that quantity of incident light on the diffuse-reflection-light receiving part gradually increases more and more.

As described above, the concentration detection part 14 emits detection light from the light-emitting part toward a toner image. Then, based on detection light reflected by the toner image and received by the light-receiving part (regular-reflection-light receiving part and diffuse-reflection-light receiving part), the concentration detection part 14 detects a toner concentration of the toner image transferred onto the outer circumferential surface of the intermediate transfer belt 31. In other words, the concentration detection part 14 detects a toner concentration of the toner image formed on the outer circumferential surface of the photosensitive drum 21 in the image forming part 20.

Next, a configuration of each image forming part 20 and its peripheries will be described with reference to FIG. 3. It is noted that since the individual-color image forming parts 20 are identical in basic configuration, notation of identification signs representing individual colors of configurational elements, as well as their description, will be omitted unless otherwise necessarily particularly limited.

Each image forming part 20 includes a photosensitive drum 21, a charging part 22, a developing part 23, and a drum cleaning part 24.

The photosensitive drum 21, which is formed into a cylindrical shape supported rotatable with its center axis horizontal, is rotated at a constant speed about a center axis by a driving part (not shown). The photosensitive drum 21 has a photosensitive layer formed of, e.g., an organic photoconductor (OPC) on an outer circumferential surface of, e.g., an aluminum or other metallic drum material pipe. An electrostatic latent image is formed on the outer circumferential surface of the photosensitive drum 21.

The charging part 22 is placed so as to face the outer circumferential surface of the photosensitive drum 21 with a specified clearance provided therebetween. The charging part 22 includes a charging wire 221 and a grid electrode 222. The charging wire 221, which is a linear electrode extending parallel to an axial direction of the photosensitive drum 21, generates corona discharge against the photosensitive drum 21. The grid electrode 222, which is a grid-shaped electrode extending in the axial direction of the photosensitive drum 21, is placed between the charging wire 221 and the photosensitive drum 21. When a specified charging current is applied to the charging wire 221, the charging part 22 generates corona discharge. Further, when a specified charging voltage is applied to the grid electrode 222, the charging part 22 makes the outer circumferential surface (surface) of the photosensitive drum 21 uniformly charged to a specified surface potential.

The developing part 23 is placed downstream of the charging part 22 in the rotational direction of the photosensitive drum 21. The developing part 23 includes a development container 231, a stirring paddle 232, a feed roller 233, and a developing roller 234.

The development container 231, which is formed into a slender shape extending along the axial direction (drawing-sheet depthwise direction of FIG. 3) of the photosensitive drum 21, is placed with its longitudinal direction horizontal.

The development container 231 has an opening 231*a* at one portion facing the photosensitive drum 21. The development container 231 contains nonmagnetic one-component toner as a developer. That is, the development container 231 contains toner to be fed to the photosensitive drum 21.

The stirring paddle 232 is placed at an upper position within the development container 231 so as to be distant from the opening 231*a* beyond the developing roller 234 and the feed roller 233. The stirring paddle 232 is supported by the development container 231 so as to be rotatable about an axis line extending parallel to the photosensitive drum 21. The stirring paddle 232 further includes a flexible film portion extending in its radial direction. The stirring paddle 232 is rotated about the axis line to stir toner present in the development container 231.

The feed roller 233 is placed at a lower position within the development container 231 between the opening 231*a* and the stirring paddle 232. The feed roller 233 is placed so as to face the developing roller 234. The feed roller 233 is supported by the development container 231 so as to be rotatable about an axis line extending parallel to the photosensitive drum 21. The feed roller 233 carries toner, which is to be fed to an outer circumferential surface of the developing roller 234, in a facing region with the developing roller 234. The feed roller 233 is rotated in the same direction as the developing roller 234.

The developing roller 234, which is placed at the opening 231*a* of the development container 231, is partly exposed from the development container 231. The developing roller 234 is placed so as to face the photosensitive drum 21 in contact with the photosensitive drum 21. The developing roller 234 is supported by the development container 231 so as to be rotatable about an axis line extending parallel to the axis line of the photosensitive drum 21. The developing roller 234 carries toner, which is to be fed to the outer circumferential surface of the photosensitive drum 21, in a facing region with the photosensitive drum 21. The developing roller 234 is rotated in a direction reverse to that of the photosensitive drum 21. The developing roller 234 feeds toner present in the development container 231 to the outer circumferential surface of the photosensitive drum 21, and makes the electrostatic latent image developed to form a toner image.

The drum cleaning part 24 is placed downstream of the primary transfer part 32 in the rotational direction of the photosensitive drum 21. The drum cleaning part 24 includes a collection container 241, and a cleaning roller 242.

The collection container 241, which is formed into a slender shape extending along the axial direction (drawing-sheet depthwise direction of FIG. 3) of the photosensitive drum 21, is placed with its longitudinal direction horizontal. The collection container 241 contains toner and other deposits removed, and collected, from the outer circumferential surface of the photosensitive drum 21 by the cleaning roller 242.

The cleaning roller 242, which is partly exposed from the collection container 241, is placed so as to face the photosensitive drum 21. The cleaning roller 242 is supported by the collection container 241 so as to be rotatable about an axis line extending parallel to the axis line of the photosensitive drum 21. The cleaning roller 242 is provided by, e.g., a sponge roller having a specified cell diameter. In process of image formation, a collection voltage is applied to the cleaning roller 242 by the voltage application part 12. The cleaning roller 242 removes and collects toner and other deposits remaining on the outer circumferential surface of the photosensitive drum 21 after the primary transfer.

In addition, the cleaning roller 242 is set in contact, at a specified pressure, with the outer circumferential surface of the photosensitive drum 21. The image forming part 20 includes a pressurizing mechanism 243 capable of varying contact pressure of the cleaning roller 242 with the photosensitive drum 21. The pressurizing mechanism 243 includes a biasing member (spring or the like) for, for example, biasing the cleaning roller 242 toward the photosensitive drum 21, a cam for varying the contact pressure, and a driving source (motor or the like) for the cam.

The cleaning roller 242 collects toner into sponge cells. As cumulated drive time of the drum cleaning part 24 is prolonged, toner is deposited in cells, making it harder for the cleaning roller 242 to collect toner. Toner collection performance by the cleaning roller 242 can be improved by properly adjusting the collection voltage (cleaning bias) of the cleaning roller 242.

Figure 4A:
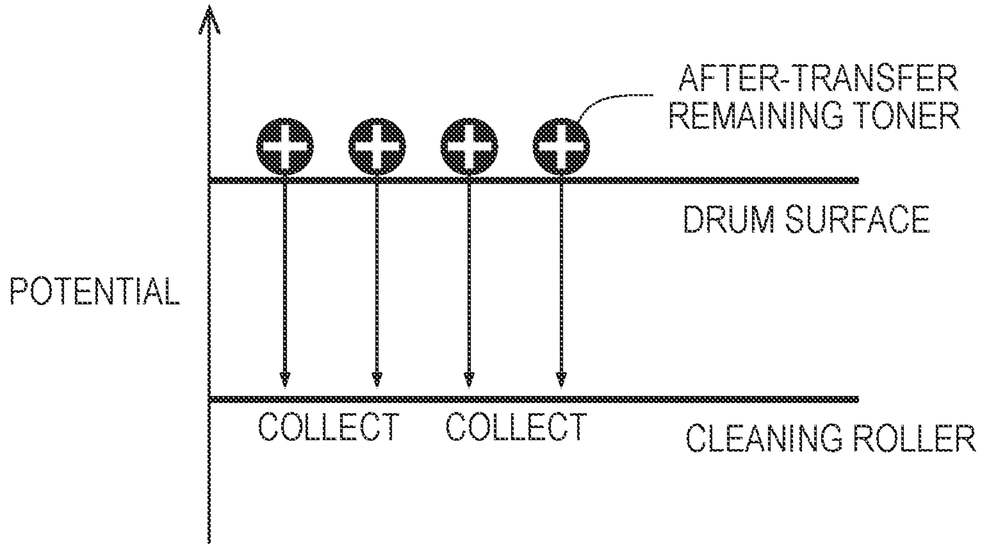
FIG. 4A is an explanatory view showing a collection principle of after-transfer remaining toner by a cleaning roller.

FIG. 4A is an explanatory view showing a collection principle of after-transfer remaining toner by the cleaning roller 242. The vertical axis in FIG. 4A represents surface potential of the photosensitive drum 21, and surface potential of the cleaning roller 242 to which the collection voltage is being applied.

In the drum cleaning part 24, there arises an electric field due to a potential difference between a surface potential of the photosensitive drum 21 and a surface potential of the cleaning roller 242 to which the collection voltage is being applied. By action of this electric field, after-transfer remaining toner on the photosensitive drum 21 is moved onto the cleaning roller 242, being collected. Since after-transfer remaining toner has been positively charged, it is preferable to apply a negative-side collection voltage to the cleaning roller 242 in cases where suitable collection of the after-transfer remaining toner in the drum cleaning part 24 is desired.

Figure 4B:
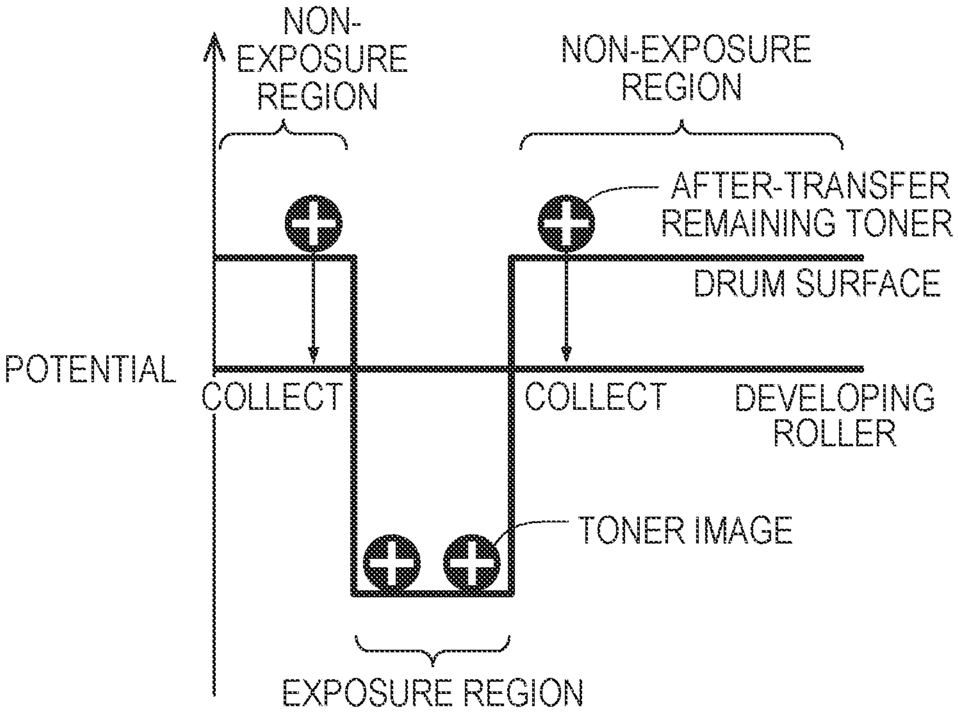
FIG. 4B is an explanatory view showing a collection principle of after-transfer remaining toner by a developing roller.

FIG. 4B is an explanatory view showing a collection principle of after-transfer remaining toner by the developing roller 234. The vertical axis in FIG. 4B represents surface potential of the photosensitive drum 21, potential of an exposure region on the photosensitive drum 21, and surface potential of the developing roller 234 to which the developing voltage is being applied.

In the developing part 23, there arises an electric field due to a potential difference between a potential of a non-exposure region on the photosensitive drum 21 and a surface potential of the developing roller 234 to which the developing voltage is being applied. By action of this electric field, after-transfer remaining toner on the photosensitive drum 21 is moved onto the developing roller 234, being collected. Toner fed as a toner image to an exposure region on the photosensitive drum 21 is not affected by such collection.

As described above, the developing part 23 is enabled to collect after-transfer remaining toner that remains on the outer circumferential surface of the photosensitive drum 21. According to this configuration, after-transfer remaining toner that has missed being collected by the drum cleaning part 24 can be collected by the developing part 23. As a result, there is generated an allowance of usable range for the collection voltage of the cleaning roller 242, i.e., it becomes possible to expand the collection-voltage usable range. Accordingly, it becomes possible to improve the collection performance for after-transfer remaining toner.

In order to attain an uncollected toner quantity of zero, the uncollected toner being a remainder of after-transfer remaining toner that has missed being collected by the drum cleaning part 24 and the developing part 23 so as to remain even after one-round rotation of the photosensitive drum 21, there is a need for suitably adjusting the collection voltage applied to the cleaning roller 242.

Figure 5A:
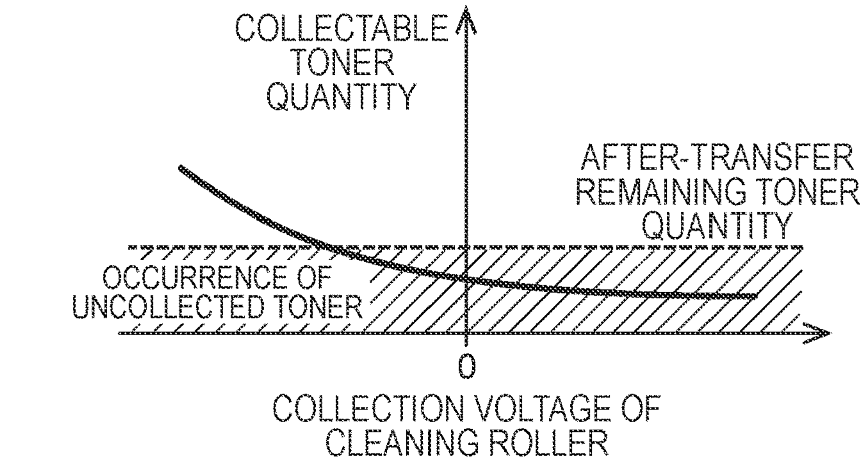
FIG. 5A is a graph showing a relationship between collection voltage of the cleaning roller and collectable toner quantity, as well as an explanatory view showing a normal state of after-transfer remaining toner collectability.

FIG. 5A is a graph showing a relationship between collection voltage of the cleaning roller 242 and collectable toner quantity, as well as an explanatory view showing a normal state of after-transfer remaining toner collectability. In the graph shown in FIG. 5A, the horizontal axis represents collection voltage applied to the cleaning roller 242, and the vertical axis represents collectable toner quantity. These definitions of the horizontal axis and the vertical axis are similarly applicable also to FIGS. 5B and 5C.

With toner positively charged, as shown in FIG. 5A, the larger on the negative side the collection voltage applied to the cleaning roller 242 becomes, the more the collectable toner quantity relative to the after-transfer remaining toner increases.

In addition, the collectability of after-transfer remaining toner differs also depending on environment and printing conditions. For example, under a high-humidity environment, liquid bridge force between toner and photoconductor is enhanced, so that the collectability of after-transfer remaining toner decreases. Also, under a low-humidity environment, toner chargeability is heightened, so that enhanced electrostatic force makes toner more likely to be moved by electric field, improving the collectability of after-transfer remaining toner. Further, depending on circumstances of printing patterns, for example when toner overlay quantity is increased locally in a drum-longitudinal direction, e.g. as with patch images, a transfer current flows into toner non-overlay portions, causing after-transfer remaining toner quantity to increase. As a result, the collectability of after-transfer remaining toner deteriorates, so that uncollected toner is more likely to occur.

Figure 5B:
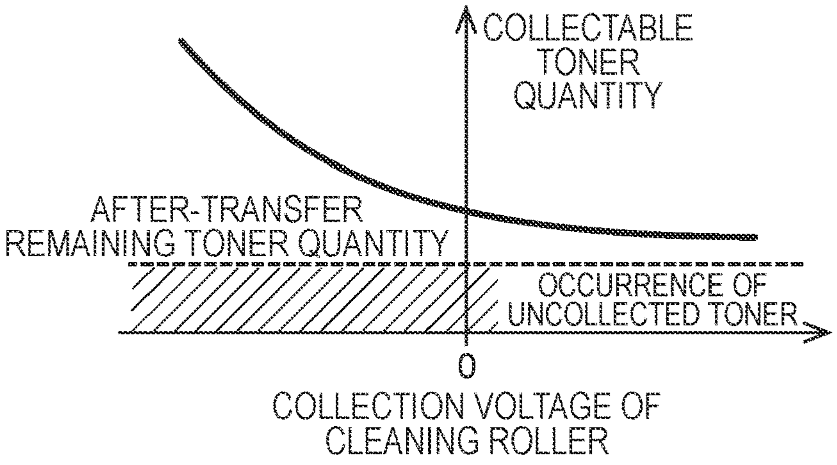
FIG. 5B is a graph showing a relationship between collection voltage of the cleaning roller and collectable toner quantity, as well as an explanatory view showing a state of high after-transfer remaining toner collectability.

FIG. 5B is a graph showing a relationship between collection voltage of the cleaning roller 242 and collectable toner quantity, as well as an explanatory view showing a state of high after-transfer remaining toner collectability. As shown in FIG. 5B, under conditions of a high after-transfer remaining toner collectability and a large collectable toner quantity, even with positive-side collection voltage applied to the cleaning roller 242, a certain quantity of after-transfer remaining toner can be collected by collection power of the developing part 23.

Figure 5C:
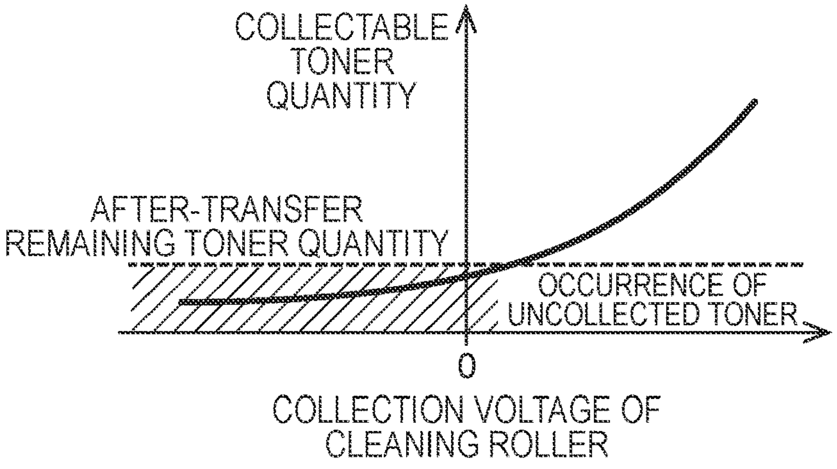
FIG. 5C is a graph showing a relationship between collection voltage of the cleaning roller and collectable toner quantity, as well as an explanatory view showing a state with a positive-side collection voltage applied.

Also, there are some cases in which applying positive-side collection voltage to the cleaning roller 242 makes the collectability of after-transfer remaining toner improved to more extent. FIG. 5C is a graph showing a relationship between collection voltage of the cleaning roller 242 and collectable toner quantity, as well as an explanatory view showing a state with a positive-side collection voltage applied.

For example, under conditions of a large charging level of negative charges due to transfer current as well as reverse-polarity (negative) charging of after-transfer remaining toner, as shown in FIG. 5C, applying positive-side collection voltage to the cleaning roller 242 makes the collectability of after-transfer remaining toner improved to more extent. Such reverse charging by the transfer current is more likely to occur when the transfer current quantity is large or when the positive chargeability of toner in the developing part 23 is low.

Figure 6:
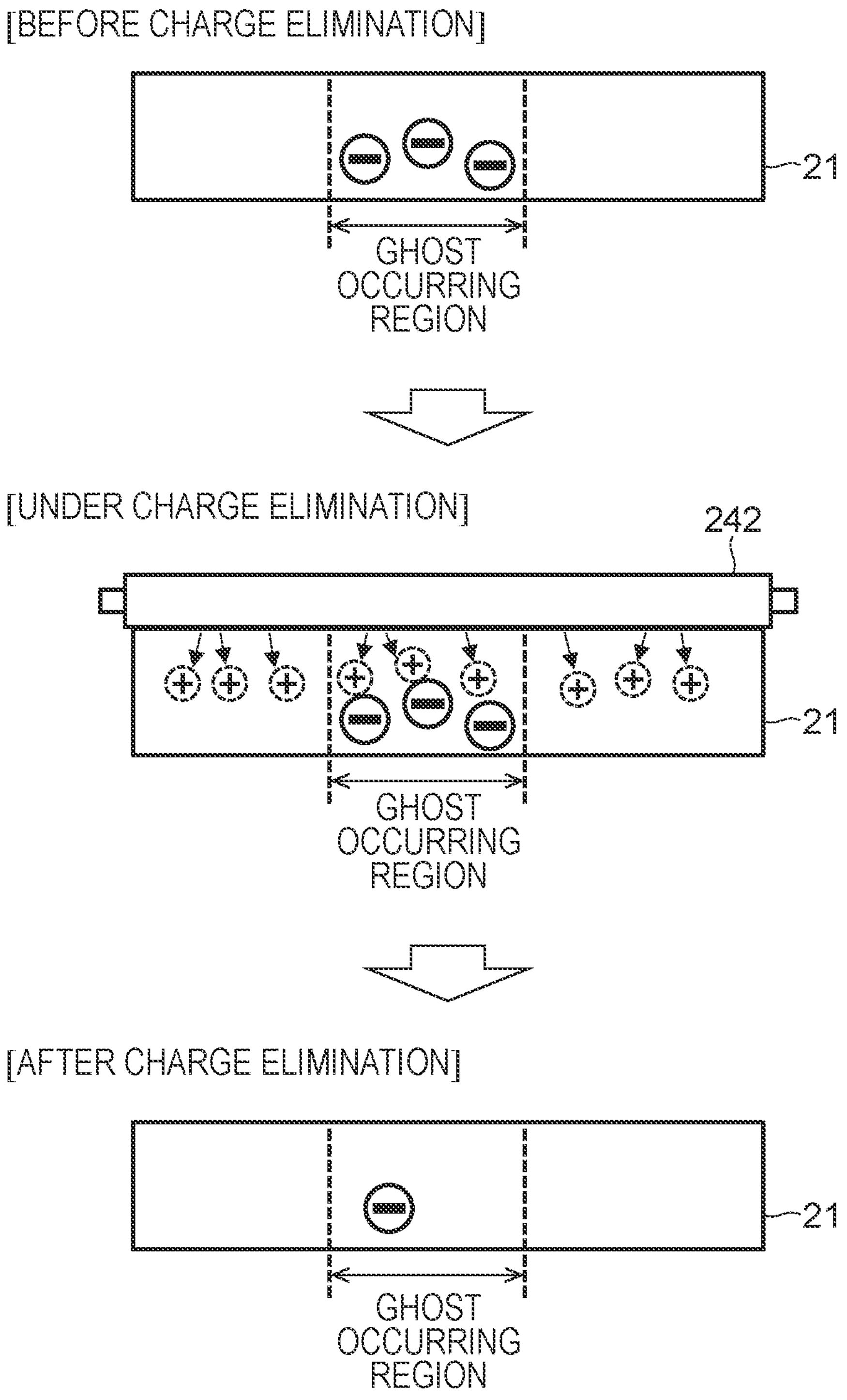
FIG. 6 is an explanatory view showing charge-eliminating process on an outer circumferential surface of a photosensitive drum with use of the cleaning roller.

A method of suppressing occurrence of ghosts (afterimages) in image formation process will be described below with reference to FIG. 6. FIG. 6 is an explanatory view showing charge-eliminating process on the outer circumferential surface of the photosensitive drum 21 with use of the cleaning roller 242.

Here is shown a case, as an example, in which positively-charged toner is used with a positively-charged photoconductor. In this case, negative charge remains inside the photoconductor through transfer process and exposure process, with a result that a ghost occurring region is generated ("BEFORE CHARGE ELIMINATION" in FIG. 6). In this ghost occurring region, the surface potential of the photosensitive drum 21 decreases, leading to concentration variations. Accordingly, as shown at "UNDER CHARGE ELIMINATION" in FIG. 6, a positive-side collection voltage is applied to the cleaning roller 242 so that the cleaning roller 242 is put into contact with the photosensitive drum 21 and the photoconductor is charged with positive charge. As a result of this, negative charge inside the photoconductor can be canceled out ("AFTER CHARGE ELIMINATION" in FIG. 6).

Then, the controller 8 of the image forming apparatus 1 in this embodiment executes calibration for adjusting collection voltage applied to the cleaning roller 242 under a situation other than image formation on a regular basis such as a predetermined number-of-printed-sheets basis or at an arbitrary timing of user's or manager's discretion.

In this calibration, the controller 8 adjusts the collection voltage applied to the cleaning roller 242 on a basis of uncollected toner quantity of a toner image, as well as on a basis of residual charge on the photosensitive drum 21, where the uncollected toner refers to part of after-transfer remaining toner which results after the toner image formed on the outer circumferential surface of the photosensitive drum 21 has been transferred onto the outer circumferential surface of the intermediate transfer belt 31 and moreover which has missed being collected by the cleaning roller 242 so as to remain even after one-round rotation of the photosensitive drum 21.

Next, the calibration for adjusting the collection voltage applied to the cleaning roller 242 will be described in detail.

The controller 8 forms, on the outer circumferential surface of the photosensitive drum 21, e.g., a reference image (patch image) which is a toner image for use in adjustment of the collection voltage applied to the cleaning roller 242, and then makes the reference image transferred onto the outer circumferential surface of the intermediate transfer belt 31. In this process, uncollected toner of the reference image, which has been collected by neither the cleaning roller 242 nor the developing part 23 so as to remain as after-transfer remaining toner of the reference image over one-round rotation of the photosensitive drum 21, is transferred onto the outer circumferential surface of the intermediate transfer belt 31, followed by detecting a toner concentration of the uncollected toner by the concentration detection part 14. Based on a density level of the toner concentration detected by the concentration detection part 14, a quantity of the uncollected toner is estimated relative to the toner image transferred onto the outer circumferential surface of the intermediate transfer belt 31.

Also, for example, based on a transfer current quantity, the controller 8 estimates a level of residual charge on the photosensitive drum 21. With a normal transfer current, as shown in FIGS. 5A and 5B, when the collection voltage applied to the cleaning roller 242 is increased on the negative side under a situation of positively charged toner, collectable toner quantity relative to after-transfer remaining toner tends to increase. On the other hand, with a larger-than-normal transfer current, as already described with reference to FIG. 5C, charging level of negative charge by the transfer current increases, so that the after-transfer remaining toner is charged to reverse polarity (negative). In this case, applying a positive-side collection voltage to the cleaning roller 242 allows the collectability of after-transfer remaining toner to be improved to more extent.

In addition, the uncollected toner quantity and the residual charge on the photosensitive drum 21 as described above may also be acquired by other commonly known detection method and prediction (estimation) method.

Next, Examples of the usable range for the collection voltage applied to the cleaning roller 242 will be described. Conditions of the image forming apparatus 1 used for evaluation of the usable range of the collection voltage are as described in Table 1.

TABLE 1

| | |
|---|---|
| MONOCHROME/COLOR | COLOR |
| LINEAR VELOCITY | 118 mm/s |
| PHOTOCONDUCTOR TYPE | POSITIVELY-CHARGED OPC |
| CHARGING METHOD | SCOROTRON CHARGING METHOD |
| CLEANING METHOD | CONTACT CLEANING METHOD |
| STATE OF CLEANING ROLLER | BRAND-NEW |
| DEVELOPMENT METHOD | NONMAGNETIC ONE-COMPONENT DEVELOPMENT METHOD |
| PRIMARY TRANSFER METHOD | INTERMEDIATE TRANSFER BELT METHOD |
| CHARGE-ELIMINATING DEVICE | NO |

Further, as shown in Table 2, three Examples 1, 2 and 3 differing thereamong in installation environment of the image forming apparatus 1 as well as in toner conditions were evaluated in terms of usable range for collection voltage applied to the cleaning roller 242.

TABLE 2

| | INSTALLATION ENVIRONMENT | TONER CONDITIONS |
|---|---|---|
| EXAMPLE 1 | LOW TEMPERATURE/ LOW HUMIDITY | BRAND-NEW |
| EXAMPLE 2 | HIGH TEMPERATURE/ HIGH HUMIDITY | DETERIORATED DURABILITY |
| EXAMPLE 3 | LOW TEMPERATURE/ LOW HUMIDITY | DETERIORATED DURABILITY |

Figure 7:
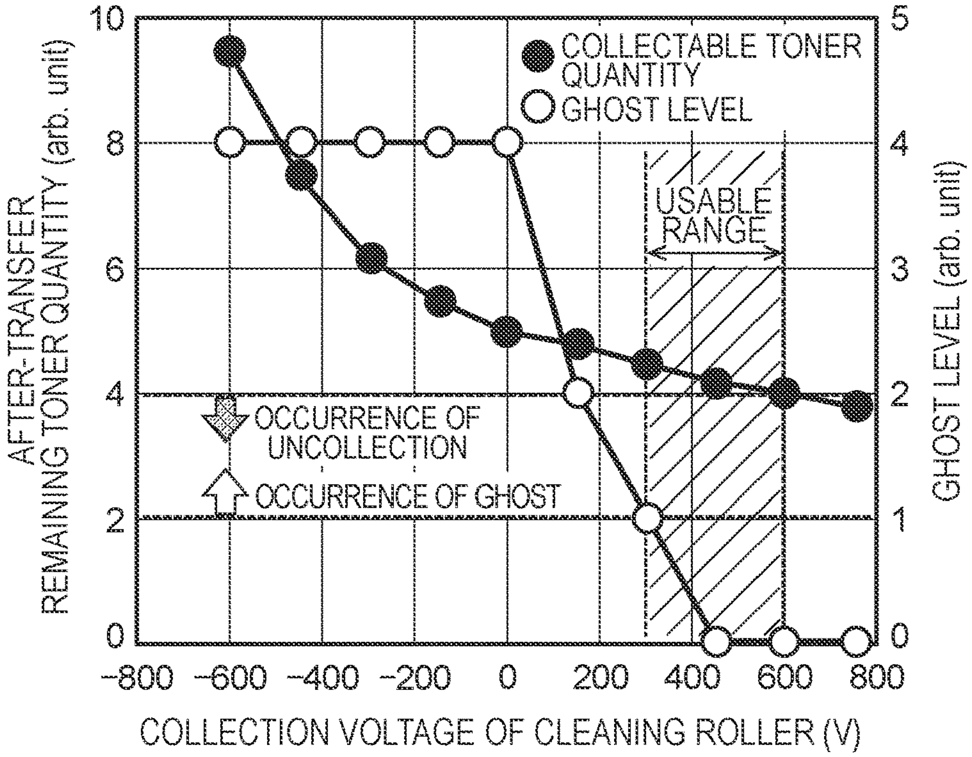
FIG. 7 is a graph showing a usable range of collection voltage to be applied to the cleaning roller in Example 1.

FIG. 7 is a graph showing a usable range of the collection voltage to be applied to the cleaning roller 242 in Example 1. In the graph shown in FIG. 7, the horizontal axis represents collection voltage (V) applied to the cleaning roller 242, while the left vertical axis represents after-transfer remaining toner quantity (arb. unit) and the right vertical axis represents ghost level (arb. unit). Definitions of these horizontal axis and vertical axes are similarly applicable to FIGS. 8 and 9 as well.

In Example 1 shown in FIG. 7, there occurs no uncollected toner on condition that the collection voltage of the cleaning roller 242 is 600 V or lower. Also, on condition that the collection voltage of the cleaning roller 242 is 300 V or higher, ghosts are suppressed to a permissible level. As a consequence, a usable range of the collection voltage applied to the cleaning roller 242 is preferably set to within a range from 300 V to 600 V where an uncollected toner non-occurring range and a ghost-suppressed range overlap with each other.

Figure 8:
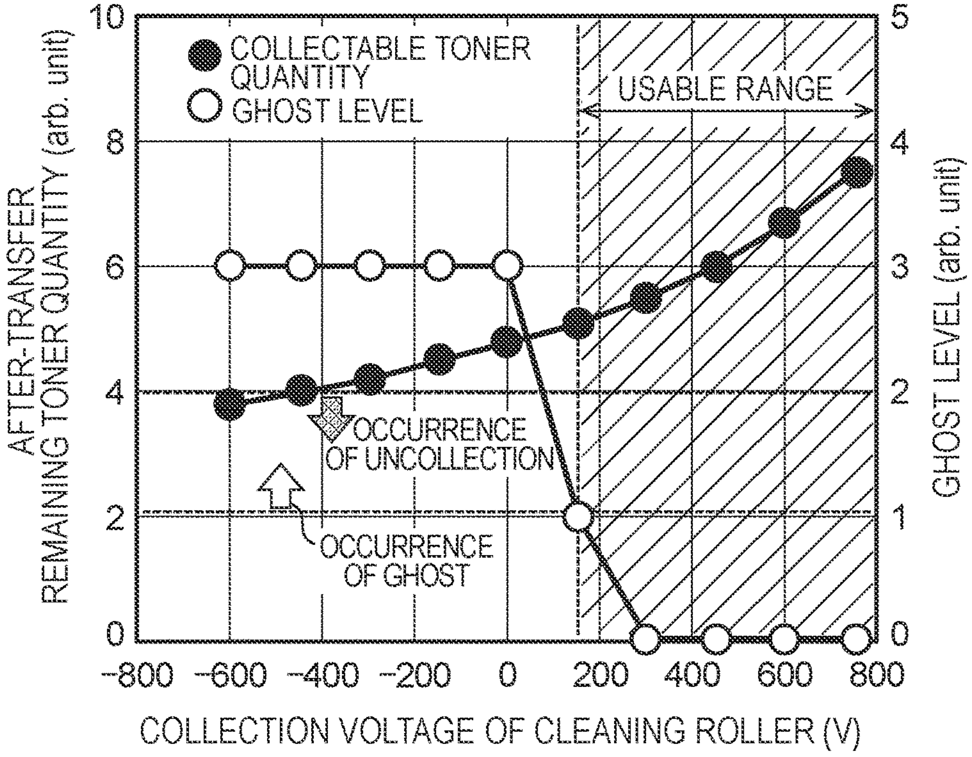
FIG. 8 is a graph showing a usable range of collection voltage to be applied to the cleaning roller in Example 2.

FIG. 8 is a graph showing a usable range of the collection voltage to be applied to the cleaning roller 242 in Example 2. FIG. 8 shows an example in which with a large charging level of negative charge due to the transfer current, after-transfer remaining toner is charged to a reverse polarity (negative). In this case, the higher on the positive side the collection voltage applied to the cleaning roller 242 is set, the more the collectability of after-transfer remaining toner is improved.

In Example 2 shown in FIG. 8, there occurs no uncollected toner on condition that the collection voltage of the cleaning roller 242 is-450 V or higher. Also, on condition that the collection voltage of the cleaning roller 242 is 150 V or higher, ghosts are suppressed to a permissible level. As a consequence, a usable range of the collection voltage applied to the cleaning roller 242 is preferably set to 150 V or higher where an uncollected toner non-occurring range and a ghost-suppressed range overlap with each other.

In the way as described above, the controller 8 adjusts the collection voltage applied to the cleaning roller 242 on a basis of uncollected toner quantity of a toner image and a level of residual charge on the photosensitive drum 21. With this configuration, since the collection voltage of the cleaning roller 242 is adjusted based on the uncollected toner quantity of a toner image, collection performance of after-transfer remaining toner can be ensured. Also, since the collection voltage of the cleaning roller 242 is adjusted based on the residual charge level on the photosensitive drum 21, charge elimination for the outer circumferential surface of the photosensitive drum 21 can be fulfilled. That is, occurrence of ghosts (afterimages) in image formation process can be suppressed effectively, so that a continuation of high-quality image formation can be practicalized.

Further, within a range involving no occurrence of uncollected toner, the controller 8 applies a collection voltage of the same polarity as toner-charging polarity to the cleaning roller 242 to fulfill charge elimination on the outer circumferential surface of the photosensitive drum 21. With this configuration, collection efficiency of after-transfer remaining toner can be improved. Furthermore, suppression effect on ghosts (afterimages) in image formation process can be enhanced to even more extent.

Figure 9:
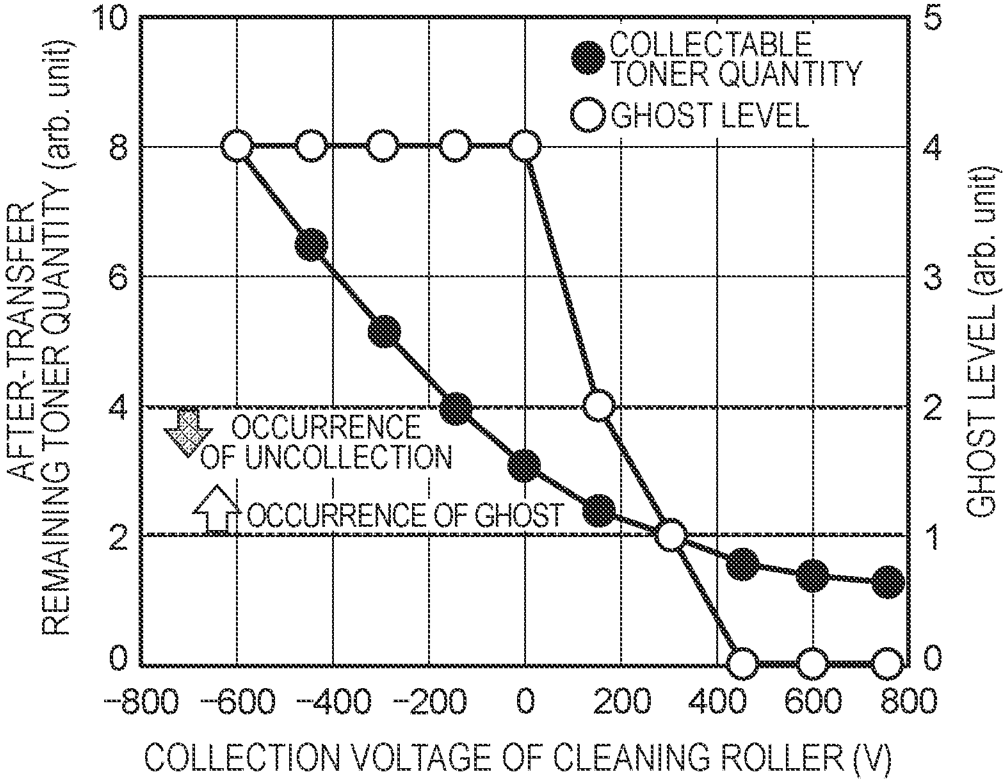
FIG. 9 is a graph showing a usable range of collection voltage to be applied to the cleaning roller in Example 3.

FIG. 9 is a graph showing a usable range of the collection voltage to be applied to the cleaning roller 242 in Example 3. FIG. 9 shows an example in which toner is deteriorated so as to have varied in chargeability and adhesion property to the photosensitive drum 21, so that the collectability of after-transfer remaining toner is degraded in comparison with Example 1.

In Example 3 shown in FIG. 9, there occurs no uncollected toner on condition that the collection voltage of the cleaning roller 242 is −150 V or lower. Also, on condition that the collection voltage of the cleaning roller 242 is 300 V or higher, ghosts are suppressed to a permissible level. Consequently, there is no overlapping between any uncollected toner non-occurring range and any ghost-suppressed range, i.e., no usable range of the collection voltage applied to the cleaning roller 242 exists.

In such a case as Example 3 shown in FIG. 9, since the collectability of after-transfer remaining toner is deteriorated, even setting the collection voltage of the cleaning roller 242 to within a ghost-suppressed range could not eliminate occurrence of uncollected toner.

Accordingly, in case of occurrence of uncollected toner, the controller 8 changes rotational speed of the cleaning roller 242 or changes contact pressure of the cleaning roller 242 with the photosensitive drum 21 by the pressurizing mechanism 243. With this configuration, the collectability of after-transfer remaining toner by the cleaning roller 242 can be improved. Consequently, it becomes implementable to suitably collect after-transfer remaining toner on the photosensitive drum 21. As a result, the uncollected toner quantity comes to a zero, so that high-quality image formation can be fulfilled.

Further, when the collectability of after-transfer remaining toner is deteriorated or when a ghost-insuppressible state has arisen, no adequate countermeasure could be given by changing the rotational speed of the cleaning roller 242 or changing the contact pressure of the cleaning roller 242 with the photosensitive drum 21. Therefore, in a case where both a residual quantity of uncollected toner and a residual charge level of the photosensitive drum 21 are equal to or higher than specified values, respectively, after adjustment of the collection voltage of the cleaning roller 242, the controller 8 gives the user, via the display part 2*d*, information on urging replacement of the developing part 23 or replacement of the cleaning roller 242.

According to this configuration, the user is enabled to prevent, in advance, occurrence of uncollected toner on the photosensitive drum 21. Therefore, occurrence of image defectives due to uncollected toner can be suppressed in the image forming apparatus 1, allowing the user to continuously obtain printed matters with high-quality image formation fulfilled.

In addition, in a case where the apparatus is so made up that the developing part 23 is integrated with the image forming parts 20 so as to be individually unreplaceable, replacement of the image forming parts 20 may be urged on occasion of replacement of the developing part 23. Similarly, in a case where the apparatus is so made up that the cleaning roller 242 is integrated with the drum cleaning part 24 or the image forming parts 20 so as to be individually unreplaceable, replacement of the drum cleaning part 24 or the image forming parts 20 may be urged on occasion of replacement of the cleaning roller 242.

Although an embodiment of this disclosure has been fully described hereinabove, yet the disclosure is not limited to the scope of this description and may be modified in various ways unless those modifications depart from the gist of the disclosure.

For instance, in the above embodiment, the image forming apparatus 1 is so configured as to include the intermediate transfer belt 31 to which toner images formed by the four image forming parts 20 are transferred in superimposition one after another. However, the apparatus is not limited to such ones. The present disclosure is also applicable to image forming apparatuses equipped with a conveyance belt that conveys a paper sheet to which toner images are transferred from the photosensitive drum, as an example.

Also in the above embodiment, the image forming apparatus 1 is described as a so-called tandem-type color-printing image forming apparatus. However, the image forming apparatus is not limited to such models. The image forming apparatus, as long as it includes an intermediate transfer belt, may be a color-printing image forming apparatus of any type other than the tandem type.

What is claimed is:

1. An image forming apparatus comprising:

an image carrier in which a photosensitive layer is formed on an outer circumferential surface of the image carrier;

a charging part for electrically charging the outer circumferential surface of the image carrier to a specified surface potential;

an exposure part for making the outer circumferential surface of the image carrier, which has been electrically charged by the charging part, exposed to light to form an electrostatic latent image with its charging level attenuated;

a developing part for feeding toner to the electrostatic latent image on the image carrier to form a toner image;

a transfer part for transferring the toner image, which has been formed on the outer circumferential surface of the image carrier, onto a transfer-objective member;

a cleaning roller for removing and collecting deposits on the outer circumferential surface of the image carrier;

a voltage application part for controlling electrical energization for the charging part, the developing part, the transfer part, and the cleaning roller; and a controller for controlling the image carrier, the charging part, the developing part, the transfer part, the cleaning roller, and the voltage application part, wherein the voltage application part is enabled to apply a bipolar voltage to the cleaning roller, and the controller:

in image formation process, makes a collection voltage applied to the cleaning roller by the voltage application part; and adjusts the collection voltage applied to the cleaning roller on a basis of uncollected toner quantity of the toner image, as well as on a basis of residual charge on the image carrier, where the uncollected toner refers to part of after-transfer remaining toner which results after the toner image formed on the outer circumferential surface of the image carrier has been transferred onto the transfer-objective member, and moreover which has missed being collected by the cleaning roller so as to remain even after one-round rotation of the image carrier.

2. The image forming apparatus according to claim 1, further comprising a concentration detection part for detecting a toner concentration of the toner image formed on the image carrier, wherein the controller:

detects presence or absence of the uncollected toner by the concentration detection part; and applies the collection voltage of same polarity as charging polarity of the toner to the cleaning roller in such fashion as to cause no occurrence of the uncollected toner, thereby fulfilling charge elimination on the outer circumferential surface of the image carrier.

3. The image forming apparatus according to claim 2, further comprising a pressurizing mechanism capable of changing contact pressure of the cleaning roller with the image carrier, wherein in case of occurrence of the uncollected toner, the controller changes rotational speed of the cleaning roller or changes the contact pressure of the cleaning roller by the pressurizing mechanism.

4. The image forming apparatus according to claim 1, further comprising an informing part for informing about a status of the image forming apparatus, wherein on condition that both remaining quantity of the uncollected toner and the residual charge are equal to or larger than specified values, respectively, after adjustment of the collection voltage, the controller gives, via the informing part, information on urging replacement of the developing part or replacement of the cleaning roller.

5. The image forming apparatus according to claim 1, wherein the developing part is enabled to collect the toner remaining on the outer circumferential surface of the image carrier.

* * * * *